(No Model.)

G. H. CHATILLON.
SPRING SCALE.

No. 505,091. Patented Sept. 19, 1893.

WITNESSES:
R. B. Shephard.
Charles E. Smith

INVENTOR
George H. Chatillon,
BY
Briesen & Knauth
his ATTORNEYS.

UNITED STATES PATENT OFFICE.

GEORGE H. CHATILLON, OF NEW YORK, N. Y.

SPRING-SCALE.

SPECIFICATION forming part of Letters Patent No. 505,091, dated September 19, 1893.

Application filed May 11, 1893. Serial No. 473,836. (No model.)

*To all whom it may concern:*

Be it known that I, GEORGE H. CHATILLON, a resident of the city, county, and State of New York, have invented an Improvement in Spring-Scales, of which the following is a specification, reference being had to the accompanying drawings, forming part hereof, wherein—

Figure 1:
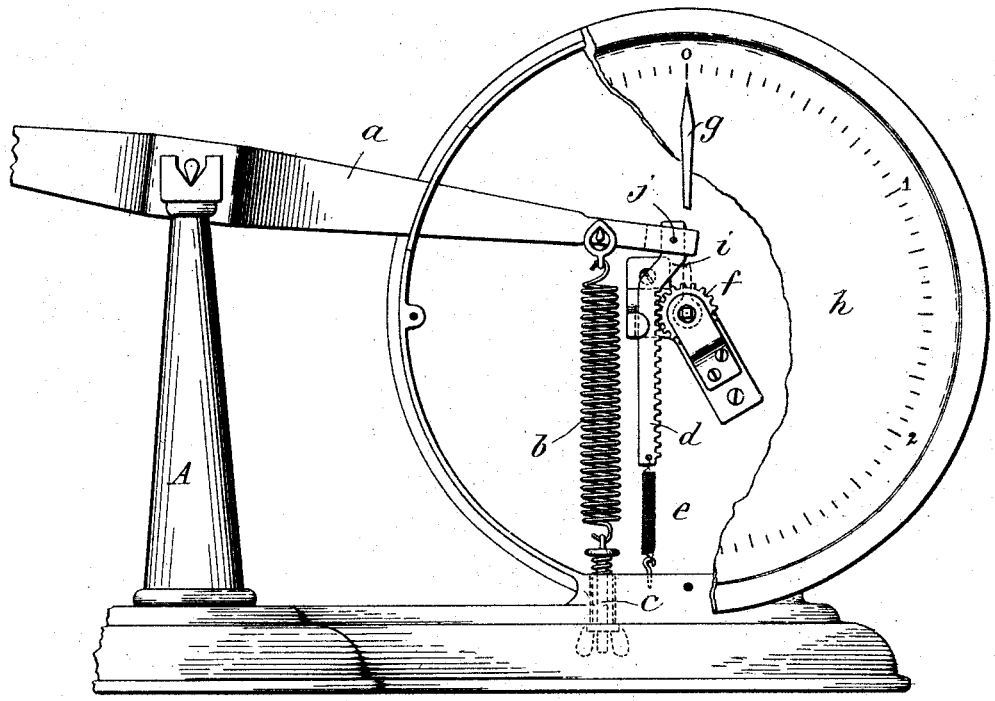
Figure 2:
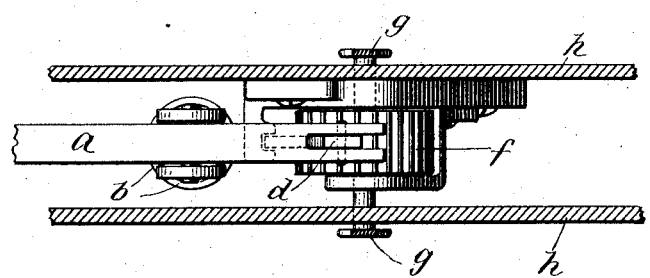

Figure 1 is a side view of a scale with parts broken away, illustrating my invention. Fig. 2 is a top view of the same.

My invention relates to spring scales and consists in the arrangement and combination of parts hereinafter described and claimed.

In the drawings $a$ represents a scale beam suitably pivoted upon a standard A. Preferably near one end of this beam $a$ is connected the main spring $b$ of the scale which may be provided with a suitable tension adjusting device as shown at $c$. To the beam $a$, and preferably at one end thereof, is pivoted a rack bar $d$ having a bend or kink $i$ which takes the rack proper out of line with the pivot. In other words, the pivot $j$ of the rack-bar stands beyond the toothed edge of the rack. To the opposite end of this rack bar $d$ is secured one end of a coiled spring $e$ the other end of said spring being attached to a fixed part of the scale, for purposes which will be hereinafter referred to. Gearing with the rack bar $d$ is a pinion $f$, the arbor of which carries the hand $g$ adapted to register on the dial $h$ the weight of the article placed upon the scale pan.

It will be observed that the spring $e$ acts in a very effective and reliable manner to keep the teeth of the rack and pinion engaged so that there will be no lost motion and at the same time so that the least possible amount of friction of the parts is had. It will also be observed that in addition to the above, the spring $e$ relieves the strain upon the main spring, and in some cases said main spring may be dispensed with entirely, a spring $e$, correspondingly strengthened, acting in its stead and performing its function.

Having thus described my invention, what I claim, and desire to secure by Letters Patent, is—

In a spring scale, the combination of the beam $a$, rack-bar $d$, one end of which is pivoted to said beam, pinion $f$ meshing therewith, and coiled spring $e$ connected to the free end of said rack bar and to a stationary part of the scale, whereby said spring $e$ exerts a resistance against the scale beam $a$ and holds the rack bar in engagement with the pinion, substantially as described.

GEORGE H. CHATILLON.

Witnesses:
CHARLES E. SMITH,
L. M. WACHSCHLAGER.